United States Patent
Kwon et al.

(10) Patent No.: US 12,021,257 B2
(45) Date of Patent: Jun. 25, 2024

(54) SEPARATOR, METHOD OF MANUFACTURING THE SEPARATOR, AND ELECTROCHEMICAL DEVICE INCLUDING THE SEPARATOR

(71) Applicants: SK INNOVATION CO., LTD., Seoul (KR); SK IE TECHNOLOGY CO., LTD., Seoul (KR)

(72) Inventors: Tae Wook Kwon, Daejeon (KR); Heung Taek Bae, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 0 days.

(21) Appl. No.: 18/331,692

(22) Filed: Jun. 8, 2023

(65) Prior Publication Data

US 2023/0402713 A1    Dec. 14, 2023

(30) Foreign Application Priority Data

Jun. 9, 2022 (KR) .......................... 10-2022-0070352

(51) Int. Cl.
| | |
|---|---|
| *H01M 50/431* | (2021.01) |
| *H01M 10/052* | (2010.01) |
| *H01M 50/403* | (2021.01) |
| *H01M 50/449* | (2021.01) |

(52) U.S. Cl.
CPC ....... *H01M 50/431* (2021.01); *H01M 10/052* (2013.01); *H01M 50/403* (2021.01); *H01M 50/449* (2021.01)

(58) Field of Classification Search
CPC ............. H01M 50/431; H01M 50/403; H01M 50/449; H01M 10/0525
See application file for complete search history.

(56) References Cited

U.S. PATENT DOCUMENTS

| | | | |
|---|---|---|---|
| 2011/0195294 A1* | 8/2011 | Lee | ...................... H01M 50/457 |
| | | | 156/247 |
| 2015/0017512 A1 | 1/2015 | Terwonne et al. | |
| 2021/0305659 A1* | 9/2021 | Kim | .................. H01M 10/4235 |

FOREIGN PATENT DOCUMENTS

| | | |
|---|---|---|
| EP | 0246698 A2 | 11/1987 |
| EP | 4246698 A1 | 9/2023 |
| KR | 10-1223081 B1 | 1/2013 |
| KR | 10-2014-0011136 A | 1/2014 |
| KR | 20150084116 A | 7/2015 |
| KR | 20160073126 A | 6/2016 |
| KR | 10-2018-0134654 A | 12/2018 |
| KR | 10-2020-0115857 A | 10/2020 |
| KR | 10-2307978 B1 | 9/2021 |

OTHER PUBLICATIONS

Extended European Search Report for the European Patent Application No. 23178446.3 issued by the European Patent Office on Oct. 18, 2023.

* cited by examiner

*Primary Examiner* — Karie O'Neill Apicella
(74) *Attorney, Agent, or Firm* — IP & T GROUP LLP

(57) ABSTRACT

Provided are a separator, a method of manufacturing the separator, and an electrochemical device including the separator. According to an embodiment of the present disclosure, a separator including: a porous substrate and an inorganic particle layer provided on at least one surface of the porous substrate may be provided, wherein a value of the following Formula (1) is 0.135 or more: (1) BDV/t, wherein BDV is a voltage (kV) when a leakage current value is 5 mA, and t is an overall average thickness (μm) of the separator.

7 Claims, No Drawings

SEPARATOR, METHOD OF MANUFACTURING THE SEPARATOR, AND ELECTROCHEMICAL DEVICE INCLUDING THE SEPARATOR

CROSS-REFERENCE TO RELATED APPLICATIONS

This application claims priority under 35 U.S.C. § 119 to Korean Patent Application No. 2022-0070352, filed on Jun. 9, 2022, the disclosure of which is incorporated herein by reference in its entirety.

TECHNICAL FIELD

The present disclosure relates to a separator, a method of manufacturing the separator, and an electrochemical device including the separator, and more particularly, to a separator having significantly improved dielectric breakdown voltage, a method of manufacturing the separator, and an electrochemical device including the separator.

BACKGROUND

Recently, as the demand for eco-friendly energy increases, research on electrochemical devices is in progress, in various fields such as electrical vehicles, including electronic devices such as mobile phones and PC. Research on an insulating separator which is interposed between a positive electrode and a negative electrode is progressing in the direction of thinning of the thickness for high capacity/high output of an electrochemical device, and according to the thinning tendency of the separator, there is a big issue in that the dielectric breakdown voltage of the separator is decreased to deteriorate withstand voltage characteristics.

Dielectric breakdown voltage (BDV) refers to voltage at which, when voltage is applied to an insulating material, voltage passes through the insulating material to cause flame discharge and the part becomes conductive to lose insulation characteristics, and higher dielectric breakdown voltage is evaluated as excellent withstand voltage. The dielectric breakdown voltage is highly dependent on the thickness of the insulating material, and as the thickness of the separator is thinned, the dielectric breakdown voltage of the electrochemical device may be decreased to deteriorate battery stability. Therefore, a separator which allows securing excellent withstand voltage characteristics simultaneously with thinning and high capacity/high output characteristics is needed.

In addition, since the separator shrinks at a high temperature which is an operating temperature of an electrochemical device to cause internal short circuit and there is a risk of fire due to the internal short circuit, dimensional stability at a high temperature should be necessarily improved for user's safety. In order to secure the dimensional stability of a separator at a high temperature, an organic-inorganic composite porous separator in a form in which an inorganic particle layer is stacked on a surface of a porous substrate has been developed. However, the organic-inorganic composite porous separator improves the dimensional stability at a high temperature to some degree, but the heat stability of the products currently on the market is still lacking. In addition, the organic-inorganic composite porous separator has a structure in which an inorganic particle layer is stacked on a porous substrate, and in this case, since the overall thickness of the separator becomes thicker, it is disadvantageous to the high capacity/high output characteristics of the electrochemical device.

RELATED ART DOCUMENTS

Patent Documents (Patent Document 1) Korean Patent Laid-Open Publication No. 10-2014-00011136 (Jan. 28, 2014)

SUMMARY

An embodiment of the present disclosure is directed to providing a separator which further improves dimensional stability at a high temperature and also secures high capacity/high output characteristics and excellent withstand voltage characteristics even in the case in which the separator is thinned, a method of manufacturing the separator, and an electrochemical device including the separator.

In one general aspect, a separator includes: a porous substrate and an inorganic particle layer provided on at least one surface of the porous substrate, wherein a value of the following Formula (1) is 0.135 or more:

$$BDV/t \tag{1}$$

wherein
'BDV' is a voltage (kV) measured in accordance with ASTM D 149 when a leakage current value is 5 mA measured under conditions of raising an applied voltage at 5 kV/10 sec after placing the separator between electrodes of a withstand voltage tester (Hipot Tester), and 't' is an overall average thickness (μm) of the separator.

In addition, according to an embodiment, the inorganic particle layer may have a (D80-D20)/D50 value of to 2.0 in a particle size distribution of inorganic particles.

In addition, according to an embodiment, when an average thickness of the porous substrate is $t_1$, the separator may have a $t_1/t$ value of 0.69 or more.

In addition, in an embodiment, the inorganic particle layer may have a packing density of 1.3 g/(m$^2$·μm) or more.

In addition, in an embodiment, the porous substrate may include a polar functional group on the surface.

In the following description, two types of specimens with a width of 5 mm and a length of 10 mm were prepared, with one specimen having a length direction in the machine direction and the other specimen having a length direction in a transverse direction. In this embodiment, when specimens each having a thickness of 5 to 50 μm, a width of mm, and a length of 10 mm in each of MD and TD serving as length directions were prepared as noted above, and each specimen is mounted on a chamber of a thermomechanical analyzer (TMA) (model: SDTA840 (Mettler Toledo)) by hooking both ends of each specimen to a metal jig and pulled downward with a force of 0.008 N while heating at 5° C. per minute, the two types of specimens were not broken until after a temperature of 180° C. was reached. In addition, in an embodiment, a heat shrinkage rate in MD and TD measured after the separator is allowed to stand at 150° C. for 60 minutes may be 3% or less.

In addition, in an embodiment, the inorganic particle layer may include inorganic particles and a hydrolytic condensate of a silane compound.

In addition, in an embodiment, the hydrolytic condensate of a silane compound may be a condensation-suppressed hydrolytic condensate produced under a weakly acidic atmosphere.

In addition, in an embodiment, the silane compound may be a compound represented by the following Chemical Formula 1:

$$A_aSi(OR)_b \qquad \text{[Chemical Formula 1]}$$

wherein 'A' is independently hydrogen, a polar functional group, or a C1-C10 alkyl group having a polar functional group, 'R' is independently hydrogen or a C1-C5 alkyl group, 'a' is 0 to 2, 'b' is 2 to 4, and a+b is 4.

In addition, in an embodiment, the polar functional group may include any one or two or more of an amino group, an epoxy group, a carboxyl group, a hydroxyl group, an amide group, a thiol group, a ketone group, an ester group, and an aldehyde group.

In another general aspect, a method of manufacturing a separator includes: (a) adding inorganic particles and an acid component to an aqueous solution of a silane compound represented by the following Chemical Formula 1 and performing stirring or bubbling to prepare a slurry; and (b) applying the prepared slurry on at least one surface of the hydrophilic surface-treated porous substrate to form an inorganic particle layer, wherein a value of the following Formula (1) is 0.135 or more:

$$A_aSi(OR)_b \qquad \text{[Chemical Formula 1]}$$

wherein 'A' is independently hydrogen, a polar functional group, or a C1-C10 alkyl group having a polar functional group, 'R' is independently hydrogen or a C1-C5 alkyl group, 'a' is 0 to 2, 'b' is 2 to 4, and a+b is 4, $$BDV/t \qquad (1)$$

wherein

'BDV' is a voltage (kV) measured in accordance with ASTM D 149 when a leakage current value is 5 mA measured under conditions of raising an applied voltage at 5 kV/10 sec after placing the separator between electrodes of a withstand voltage tester, and 't' is an overall average thickness (μm) of the separator. The withstand voltage tester may apply test voltages to measure a breaking current of the separator.

In addition, in an embodiment, a $(D_{80}-D_{20})/D_{50}$ value may be 0.01 to 2.0 in the inorganic particles.

In addition, in an embodiment, the polar functional group may include any one or two or more of an amino group, an epoxy group, a carboxyl group, a hydroxyl group, an amide group, a thiol group, a ketone group, an ester group, and an aldehyde group.

In addition, in an embodiment, the preparing of the slurry in the process (a) may be performed under a weakly acidic atmosphere of more than pH 4 and pH 7 or less.

In addition, in an embodiment, the acid component may be carbon dioxide; or an organic acid including any one or two selected from acetic acid and lactic acid.

In addition, according to an embodiment, a method of manufacturing a separator may further includes: I aging the porous substrate having the inorganic particle layer provided thereon, after the process (b).

In addition, in an embodiment, the hydrophilic surface treatment of the porous substrate may be obtained by treatment with at least one of a corona discharge treatment and a plasma discharge treatment.

In still another general aspect, an electrochemical device includes: the separator of one of the embodiments described above.

Other features and aspects will be apparent from the following detailed description, and the claims.

DETAILED DESCRIPTION OF EMBODIMENTS

Hereinafter, the present disclosure will be described in more detail with reference to embodiments. However, the following specific examples are only a reference, and the present disclosure is not limited thereto and may be implemented in various forms.

In addition, unless otherwise defined, all technical terms and scientific terms have the same meanings as those commonly understood by one of those skilled in the art to which the present disclosure pertains. The terms used herein are only for effectively describing a certain specific example, and are not intended to limit the present disclosure.

In addition, the singular form used in the specification and claims appended thereto may be intended to include a plural form also, unless otherwise indicated in the context.

In addition, unless particularly described to the contrary, "comprising" any elements will be understood to imply further inclusion of other elements rather than the exclusion of any other elements.

In the present specification, "D50" refers to a particle diameter of inorganic particles which corresponds to 50% of a volume-based integration fraction. "D80" refers to a particle diameter of inorganic particles which corresponds to 80% of a volume-based integration fraction. "D20" refers to a particle diameter of inorganic particles which corresponds to 20% of a volume-based integration fraction. D50, D80, and D20 may be derived from particle size distribution results obtained by collecting a sample of the inorganic particles to be measured in accordance with the standard of KS A ISO 13320-1 and performing analysis using a Multisizer 4e Coulter counter available from Beckman coulter.

In the present specification, "overall average thickness (t) of a separator" refers to the overall average thickness of a separator including a porous substrate and an inorganic particle layer provided on at least one surface of the porous substrate. In an embodiment, the overall average thickness (t, μm) of the separator may be determined by the following method. The separator is overlapped in 10 layers, each thickness is measured at 5 random points in TD by a thickness meter available from Mitutoyo, the value is divided by 5 to derive an average thickness of the 10-layer separator, and the value is divided by 10 again to derive an overall average thickness of a single separator.

In the present specification, "average thickness ($t_1$) of a porous substrate" refers to an average thickness of only a porous substrate having no inorganic particle layer provided on at least one surface. In an embodiment, the average thickness, $t_1$ (μm) of the porous substrate may be determined by the following method. Only the porous substrate having no inorganic particle layer provided on at least one surface is overlapped in 10 layers, each thickness is measured at 5 random points in TD by a thickness meter available from Mitutoyo, the value is divided by 5 to derive an average thickness of the 10-layer porous substrate, and the value is divided by 10 again to derive the average thickness $t_1$ of the porous substrate. In the case in which the average thickness $t_1$ of the porous substrate having the inorganic particle layer provided on at least one surface is determined, the inorganic particle layer is released using all methods known in the art without limitation and is sufficiently dried, and the average thickness $t_1$ of the porous substrate from which the inorganic particle layer has been released is determined.

In the present specification, "packing density of inorganic particle layer" refers to a density ($g/(m^2 \cdot \mu m)$) of the inorganic particle layer loaded to the unit area ($m^2$) and the unit height ($\mu m$) of the porous substrate. In an embodiment, a method of measuring the packing density of the inorganic particle layer may be according to the following method. The average thickness $t_1$ of the porous substrate and the overall average thickness t of the separator having the inorganic particle layer provided on the porous substrate are measured, respectively, and the average thickness $t_1$ of the porous substrate is subtracted from the overall average thickness t of the separator to calculate the thickness (T, $\mu m$) of the inorganic particle layer. The separator having the inorganic particle layer provided on at least one surface of the porous substrate is cut into an area (S, $m^2$) of 10 mm×10 mm (0.01 $m^2$) to measure the weight, and the weight of the porous substrate is subtracted to calculate the weight (W,g) of only the inorganic particle layer. The packing density of the inorganic particle layer is calculated by w/(T*S).

According to an embodiment, a secondary battery separator having an inorganic particle layer in which inorganic particles are connected to each other to form pores on at least one surface of the porous substrate, provided on at least one surface of a porous substrate, is provided, and a hydrolytic condensate of a polar silane compound which is prepared under specific conditions of hydrolyzing a silanol or alkoxysilane-based compound and simultaneously suppressing condensation may be used as a binder of the inorganic particle layer to significantly improve the thermal stability of the separator.

In addition, simultaneously, according to the embodiment, a binder which is the condensation-suppressed hydrolytic condensate of a silane compound and inorganic particles having a specific particle size distribution are applied to the inorganic particle layer together, thereby further increasing the packing density of the inorganic particle layer, and thus, significantly improving dielectric breakdown voltage with a thin separator. Accordingly, dimensional stability at a high temperature may be further improved and also high capacity/high output characteristics and excellent withstand voltage characteristics may be secured.

It is unclear but is considered that the inorganic particles may be more closely and strongly connected and fixed with the binder which is the condensation-suppressed hydrolytic condensate of a silane compound, and inorganic particles having a certain particle size distribution may be used to decrease unnecessary voids to achieve the effect.

An embodiment may provide a separator having a value of the following Formula (1) of 0.135 or more, 0.14 or more, or more, or 0.15 or more:

$$BDV/t \tag{1}$$

wherein 'BDV' is a voltage (kV) measured in accordance with ASTM D 149 when a leakage current value is 5 mA which is measured under the conditions in which the separator is placed between electrodes of a withstand voltage tester (Croma, model 19052) under a dry room (dew point temperature: −60° C.) and then an applied voltage is raised at 5 kV/10 sec. The voltage at this time is evaluated as dielectric breakdown voltage. 't' is an overall average thickness ($\mu m$) of the separator.

The separator according to an embodiment may secure high capacity/high output characteristics and excellent withstand voltage characteristics while further improving dimensional stability at a high temperature even with a thin inorganic particle layer being provided on at least one or both surfaces of the porous substrate. In an embodiment, when an average thickness of the porous substrate is $t_1$, a $t_1/t$ value may be 0.69 or more, 0.7 or more, 0.72 or more, or more, less than 1.0, 0.9 or less, 0.8 or less, or between the numerical values. In an embodiment, the $t_1/t$ value may be 0.69 or more or 0.69 or more and less than 1.0. In an embodiment, the $t_1/t$ value may be 0.72 or more or 0.72 or more and less than 1.0.

In an embodiment, a packing density of the inorganic particle layer may be 1.3 $g/(m^2 \cdot \mu m)$ or more, 1.32 $g/(m^2 \cdot \mu m)$ or more, 1.35 $g/(m^2 \cdot \mu m)$ or more, 1.38 $g/(m^2 \cdot \mu m)$ or more, 2.5 $g/(m^2 \cdot \mu m)$ or less, 2.3 $g/(m^2 \cdot \mu m)$ or less, 2.0 $g/(m^2 \cdot \mu m)$ or less, or between the numerical values.

An embodiment may provide a separator which has better thermal stability so that when the separator is manufactured into specimens each of which has a thickness of 5 to 50 $\mu m$, a width of 5 mm, and a length of 10 mm in which a length direction is MD and TD, and the specimen is mounted on a chamber of TMA (Thermomechanical Analyzer, Model: SDTA840 (Mettler Toledo)) by hooking both ends of the specimen to a metal jig and pulled downward with a force of 0.008 N while heating at 5° C. per minute, the specimen is broken at a temperature of 180° C. or higher, 190° C. or higher, 200° C. or higher, or 210° C. or higher in both MD and TD.

In an embodiment, the separator may have a heat shrinkage rate in MD and TD measured after the separator is allowed to stand at 150° C. for 60 minutes of 3% or less, 2.5% or less, 2% or less, or 1% or less.

The configuration of the separator is not particularly limited on the premise of achieving the physical properties described above.

In an embodiment as a means of imparting the physical properties, a separator including the porous substrate and the inorganic particle layer provided on at least one surface of the porous substrate in which the inorganic particle layer includes inorganic particles and the hydrolytic condensate of a silane compound may be provided. In addition, the separator may be obtained by performing a corona or plasma discharge treatment on the surface of the porous substrate to introduce a polar functional group, and adopting the condensation-suppressed hydrolytic condensate of a silane compound as a binder of the inorganic particle layer, but the manufacturing means is not limited as long as the separator having the physical properties is achieved.

In the embodiment, the reason that the packing density of the inorganic particle layer is high and the dielectric breakdown voltage is improved to improve withstand voltage characteristics is unclear, but it is considered that a polar functional group is provided on the surface of the porous substrate by the corona or plasma discharge treatment, the provided polar functional group is closely bonded to a binder which is the hydrolytic condensate of a silane compound and fixes the inorganic particle layer chemically, by a secondary bonding force such as a hydrogen bond, or the like, thereby further increasing the packing density of the inorganic particle layer, and thus, a surprising effect of significantly improving dielectric breakdown voltage with a thin separator is generated.

Hereinafter, each component of the separator according to embodiments of the present disclosure will be described.

According to an embodiment, the porous substrate may use polyolefin such as polyethylene and polypropylene, and may be a film or sheet composed of any one or two or more resins selected from the group consisting thereof.

The polyolefin-based porous substrate is usually manufactured in a film form and is not limited as long as it is usually used as a separator of an electrochemical device, and an example thereof includes polyethylene, polypropylene, copolymers thereof, and the like, but is not necessarily limited thereto.

The thickness of the porous substrate is not particularly limited, but for example, may be 1 μm or more, 3 μm or more, 5 μm or more and 100 μm or less, 50 μm or less, 30 μm or less, 20 μm or less, 15 μm or less, or between the numerical values. The thickness of the porous substrate may be, as a non-limiting example, 1 to 100 μm, for example, 5 to 50 μm, and more for example 5 to 30 μm. The porous substrate may be, according to an example, a porous polymer substrate manufactured by stretching.

In an embodiment, the porous substrate may include a polar functional group on the surface. A non-limiting example of the polar functional group may include a carboxyl group, an aldehyde group, a hydroxyl group, and the like, but is not particularly limited. The polar functional group may be, according to an example, introduced by a hydrophilic surface treatment, and the hydrophilic surface treatment may be performed by, according to an example, one or more of a corona discharge treatment and a plasma discharge treatment. The packing density of the inorganic particle layer may be further increased by the polar functional group provided on the surface of the porous substrate and the binder which is the hydrolytic condensate of a silane compound described later chemically or by a secondary bond such as a hydrogen bond, and thus, dielectric breakdown voltage may be significantly improved by a thin separator.

In an embodiment, the inorganic particle layer may include the inorganic particles and the hydrolytic condensate of a silane compound, and may be a porous inorganic particle layer in which the inorganic particles are connected and fixed by the hydrolytic condensate of a silane compound to form pores. In an embodiment, the inorganic particle layer is provided on at least one surface of the porous substrate, and may occupy an area fraction of 60% or more, 70% or more, 80% or more, or 90% or more based on an overall surface of the porous substrate, or the inorganic particle layer may be provided on the entire surface of the porous substrate.

In an embodiment, the inorganic particle layer may be coated on at least one surface or both surfaces of the porous substrate, and when both surfaces of the porous substrate are coated with the inorganic particle layer, the thicknesses of the inorganic particle layers coated on one surface and the other surface may be the same as or different from each other. Without particular limitation, in an embodiment, the thickness of the inorganic particle layer coated on one surface may be more than 0 μm, 0.3 μm or more, 0.5 μm or more and 2 μm or less, 1.5 μm or less, 1 μm or less, or between the numerical values. In an embodiment, the thickness of the inorganic particle layer may be more than 0 μm and 2 μm or less. In an embodiment, the thickness of the inorganic particle layer may be more than 0 μm and 1.5 μm or less. In an embodiment, the thickness of the inorganic particle layer may be more than 0 μm and 1 μm or less.

In an embodiment, the inorganic particles are not limited as long as they are inorganic particles used in the art. A non-limiting example of the inorganic particles may include one or two or more of metal hydroxides, metal oxides, metal nitrides, and metal carbides, or one or two or more of $SiO_2$, SiC, MgO, $Y_2O_3$, $Al_2O_3$, $CeO_2$, CaO, ZnO, $SrTiO_3$, $ZrO_2$, $TiO_2$, and AlO(OH). In terms of battery stability and the like, the inorganic particles may be for example metal hydroxide particles such as boehmite.

Though the metal hydroxide is not particularly limited, a non-limiting example thereof may include one or two or more of boehmite, aluminum hydroxide, and magnesium hydroxide. In an embodiment, when the boehmite is used, for example, a specific surface area (BET) may be 10 $m^2/g$ or more or 15 $m^2/g$ or more, but the present disclosure is not limited thereto.

As a example, the inorganic particles may be boehmite, in which the specific surface area (BET) of boehmite may be $m^2/g$ or more, specifically 15 $m^2/g$ or more.

In an embodiment, the packing density of the inorganic particle layer may be further increased by applying the inorganic particles having a specific particle size distribution and the binder which is the condensation-suppressed hydrolytic condensate of a silane compound together, and thus, dielectric breakdown voltage may be significantly improved by a thin separator. As an embodiment, a (D80–D20)/D50 value may be 0.01 or more, 0.03 or more, 0.05 or more, 0.1 or more, 0.2 or more and 2.0 or less, 1.8 or less, 1.5 or less, 1.3 or less, 1.2 or less, or between the numerical values in the particle size distribution of the inorganic particles. As a non-limiting example, the (D80–D20)/D50 value may be 0.01 to 2.0. In an embodiment, the (D80–D20)/D50 value may be 0.01 to 1.8. In an embodiment, the (D80–D20)/D50 value may be 0.01 to 1.5. When the inorganic particles satisfy the particle size distribution in the above range, they are bound to the condensation-suppressed hydrolytic condensate of a silane compound to further increase packing density and further increase dielectric breakdown voltage, and thus, further improve withstand voltage characteristics.

Though it is not particularly limited as long as the particle size distribution is satisfied, a non-limiting example of the D50 value of the inorganic particles may be 0.3 μm or less or 0.25 μm or less.

Next, an embodiment of a binder in which an inorganic particle layer having pores formed by connecting the inorganic particles is formed will be described. According to an embodiment of the present disclosure, as the binder, a hydrolytic condensate of a silane compound may be used.

An embodiment of the binder which is the hydrolytic condensate of a silane compound may be a low-molecular weight condensate in which the polar silane compound represented by the following Chemical Formula 1 is condensed, but hydrolysis and a condensed molecular weight are very suppressed under specific conditions:

  [Chemical Formula 1]

wherein 'A' is independently hydrogen, a polar functional group, or a C1-C10 alkyl group having a polar functional group, 'R' is independently hydrogen or a C1-C5 alkyl group, 'a' is 0 to 2, 'b' is 2 to 4, and a+b is 4. In an embodiment, it may be preferred in terms of adhesive strength and the like to use a low-molecular weight condensate which is condensed using the silane compound of Chemical Formula 1 wherein 'b' is 3.

In an embodiment, the polar functional group may be any one of an amino group, an epoxy group, a carboxyl group, a hydroxyl group, an amide group, a thiol group, a ketone group, an ester group, and an aldehyde group, or a reactive group which reacts with them. According to an embodiment, the polar functional group may be an amino group.

A non-limiting example of the silane compound satisfying Chemical Formula 1 may be any one or a mixture of two or more selected from (3-aminopropyl)triethoxysilane, (3-aminopropyl)trimethoxysilane, and (3-glycidyloxypropyl)trimethoxysilane, and the like, but is not particularly limited thereto.

In an embodiment, since the hydrolytic condensate of a silane compound is prepared under the conditions of hydrolyzing a silane compound and also suppressing condensation, it has a low molecular weight. In an embodiment, the hydrolytic condensate of a silane compound may be a condensation-suppressed hydrolytic condensate produced under a weakly acidic atmosphere, and may be prepared with a very low molecular weight by suppressing a condensation reaction under a weakly acidic atmosphere. In an embodiment, the hydrolytic condensate of a silane compound may be a low molecular weight hydrolytic condensate having a number average molecular weight of, for example, 4000 or less, 2000 or less, or 1000 or less.

Meanwhile, usually, when the silane compound of Chemical Formula 1 is condensed by a strong acid such as an inorganic acid, a polysiloxane condensate having a number average molecular weight of more than 4000 is produced, but the condensation-suppressed hydrolytic condensate of the silane compound of an embodiment of the present disclosure has a hydrolysate of itself, an unreacted material in a monomer form, and a dimer hydrolytic condensate as main components, and is different in that it is a hydrolytic condensate including a trace amount of a trimer hydrolytic condensate or a tetramer hydrolytic condensate.

That is, in an embodiment, the hydrolytic condensate of a silane compound may include any one or two or more selected from a hydrolysate, a monomer, the hydrolyzed and condensed multimers such as dimer, trimer, tetramer, and pentamer of the silane compound.

The hydrolytic condensate of the low-molecular weight silane compound as the above may be confirmed from a detection peak detected in positive ESI-MS analysis, using positive electrospray ionization Fourier-transform ion cyclotron resonance Mass Spectrometry analysis (posESI FT-ICRMS) (manufacturer: Bruker, model name: Solarix 2XR). That is, as a result of the positive ESI-MS analysis, a silanol as a hydrolysate and a dimer peak as a condensate are observed as main components, a trace amount of trimer and tetramer peaks are observed, and the peaks of tetramer or higher are hardly detected within 1 or 2 days during which a slurry is usually prepared. However, when hydrolysis-condensation is performed for 24 hours using hydrochloric acid which is an inorganic acid, though not attached separately, the high molecular weight peaks are observed in a complicated manner. From the results, it may be confirmed that different forms of materials are obtained from the hydrolytic condensate of a silane compound prepared under a weakly acidic atmosphere and the hydrolytic condensate prepared with an inorganic acid and the like.

The hydrolytic condensate of a silane compound according to an embodiment is prepared to have a relatively low molecular weight by condensing a silane compound including a polar functional group under the conditions in which a condensation reaction is more suppressed than a hydrolysis reaction, and may secure a more fraction of the polar group at the same weight than that of a polysiloxane condensate which is usually condensed by an inorganic acid and the like and prepared to have a high molecular weight. Surprisingly, the hydrolytic condensate of a silane compound has a further improved binding force to connect inorganic particles to each other and has further improved dimensional stability at a high temperature. Furthermore, when the surface of the porous substrate is hydrophilically treated, the polar functional group introduced by the surface treatment and the binder interact to closely adhere the inorganic particle layer on the porous substrate to increase the packing density, increase insulation voltage, and increase withstand voltage characteristics.

In an embodiment, the condensation-suppressed hydrolytic condensate of a silane compound may be obtained under a weakly acidic atmosphere of more than pH 4 and pH 7 or less, and according to a non-limiting example, any one or two or more of, in particular, carbon dioxide, acetic acid, and lactic acid may be added to an aqueous solution to prepare a weakly acidic atmosphere in the above pH range, and the addition method may be mixing the acid solution in a liquid phase or blowing or bubbling acid gas.

Next, an embodiment of the method of manufacturing a separator will be described.

As an embodiment, a method of manufacturing a separator including: (a) adding inorganic particles and an acid component to an aqueous solution of a silane compound represented by the following Chemical Formula 1 and performing stirring or bubbling to prepare a slurry; and (b) applying the prepared slurry on at least one surface of the hydrophilic surface-treated porous substrate to form an inorganic particle layer may be provided:

$$A_a Si(OR)_b \qquad \text{[Chemical Formula 1]}$$

wherein 'A' is independently hydrogen, a polar functional group, or a C1-C10 alkyl group having a polar functional group, 'R' is independently hydrogen or a C1-C5 alkyl group, 'a' is 0 to 2, 'b' is 2 to 4, and a+b is 4.

The polar functional group may include any one or two or more of an amino group, an epoxy group, a carboxyl group, a hydroxyl group, an amide group, a thiol group, a ketone group, an ester group, and an aldehyde group.

Hereinafter, each process of the method of manufacturing a separator according to the embodiment will be described. Since the description of each of the silane compound, the inorganic particles, and the porous substrate is as described above, it will be omitted for convenience.

According to an embodiment of the present disclosure, the condensation reaction of a silane compound is more suppressed than the hydrolysis reaction thereof by the process (a) to prepare the hydrolytic condensate of a silane compound. As a result, the hydrolytic condensate of a silane compound includes the hydrolysate of itself, an unreacted material in a monomer form, and a dimer hydrolytic condensate as main components, and a trace amount of a trimer hydrolytic condensate or a tetramer hydrolytic condensate, and thus, may have a very low molecular weight, for example, a number average molecular weight of 4000 or less, 2000 or less, or 1000 or less. Further, the hydrolytic condensate of a silane compound according to an embodiment of the present disclosure is different from a polysiloxane condensate having a number average molecular weight of several thousand more than 4000 which is condensed by a strong acid such as a common inorganic acid.

In an embodiment, as a means for suppressing a condensation reaction more than a hydrolysis reaction, the preparing of the slurry in the process (a) may be performed under a weakly acidic atmosphere. In an embodiment, the weakly acidic atmosphere may be more than pH 4, pH 4.5 or more, pH 5 or more, pH 5.5 or more, pH 6 or more, pH 6.5 or more and pH 7 or less or between the numerical values. In an embodiment, the weakly acidic atmosphere may be more than pH 4 and pH 7 or less or pH 4.5 or more and pH 7 or less.

Meanwhile, in the case of pH 4 or less, in the case of a basic atmosphere (more than pH 7), or in the case of using an inorganic acid such as sulfuric acid or hydrochloric acid, a condensation reaction-suppressed hydrolytic condensate of a silane compound may not be obtained in the hydrolysis reaction-condensation reaction, and thus, dimensional stability at a high temperature may not be sufficiently improved, dispersibility of a prepared slurry is poor, and an issue may arise when the inorganic particles are filled by cohesion of the binder. In addition, since the thickness of the inorganic particle layer is very non-uniformly formed, it may be difficult to secure the high capacity/high output characteristics or withstand voltage characteristics to be desired in the present disclosure.

In addition, in the preparing of the slurry in process (a), a method of adding components forming the slurry or the order is not particularly limited, and all possible methods may be used. For example, in an embodiment, the silane compound represented by Chemical Formula 1 and an acid aqueous solution including an acid component are separately prepared, inorganic particles, an acid component, and water are stirred to separately prepare an inorganic slurry, and then the separately prepared acid aqueous solution and the inorganic slurry are stirred to prepare a coating slurry.

According to an embodiment, the acid component of the process (a) may be carbon dioxide; or an organic acid including one or two selected from acetic acid and lactic acid. When carbon dioxide is added to a silane compound aqueous solution and then stirring or bubbling is performed, it may become carbonic acid. When the acid component is used, the effect of the present disclosure may be achieved better and the condensation reaction may be easily suppressed in the pH range, and thus, it is more preferred, but is not limited thereto as long as the separator having the physical properties of the present disclosure is provided.

As a method of preparing a slurry, all common methods known in the art may be applied without limitation, and though it is not particularly limited, according to a non-limiting example, stirring is performed at 0 to 60° C. for 1 hour to 5 days to disperse inorganic particles to prepare a slurry, and coagulated inorganic particles may be dispersed using a ball mill.

According to an embodiment of the present disclosure, the inorganic particle layer may be provided on at least one surface of the hydrophilic surface treated porous substrate by the process (b). As a method of applying the slurry, all common method known in the art may be applied, and though drying for forming the inorganic particle layer is not particularly limited, drying may be performed at 100° C. or lower or 30 to 60° C.

The hydrophilic surface treatment of the porous substrate in an embodiment may be obtained by one or more of a corona discharge treatment and a plasma discharge treatment, and a polar functional group such as a carboxyl group, an aldehyde group, and a hydroxyl group may be introduced by the hydrophilic surface treatment. When the polar functional group is included on the surface of the porous substrate, the binder which is the hydrolytic condensate of a silane compound and fixes the inorganic particle layer and the polar functional group on the porous substrate interact chemically or by a hydrogen bond and the like to further increase the packing density of the inorganic particle layer, and thus, the dielectric breakdown voltage may be significantly improved by a thin separator.

In an embodiment, after the drying, a process of aging the porous substrate having the inorganic particle layer formed thereon may be further included. Specifically, the aging may be performed at 50 to 150° C., for example 65 to 120° C., the aging time may be 2 hours to 24 hours, for example to 20 hours. In an embodiment, it may be performed in a temperature range of 70 to 120° C. for 10 to 15 hours. Since by the aging, adhesive strength between the porous substrate and the inorganic particle layer is increased and dimensional stability at a high temperature may be further improved, the aging is preferred.

According to an embodiment of the present disclosure, an electrochemical device including the separator according to an embodiment of the embodiments described above may be provided, and the electrochemical device may be any known energy storage device, and is not particularly limited, but as a non-limiting example, may be a lithium secondary battery. Since the lithium secondary battery is well known and its configuration is also known, it will not be described in detail in the present disclosure.

The lithium secondary battery according to an embodiment of the present disclosure may include the separator described above between a positive electrode and a negative electrode. Herein, the positive electrode and the negative electrode may be used without limitation as long as they are commonly used in the lithium secondary battery.

Hereinafter, the present disclosure will be described in more detail with reference to the examples and the comparative examples. However, the following examples and comparative examples are only an example for describing the present disclosure in more detail, and do not limit the present disclosure in any way.

First, the measurement of physical properties and the evaluation method of the separator will be described.

[Average Thickness of Separator (t, $t_1$)]

The overall average thickness t (μm) of a separator was determined by the following method. The separator was overlapped in 10 layers, each thickness was measured at 5 random points in TD by a thickness meter available from Mitutoyo, the value was divided by 5 to derive an average thickness of the 10-layer separator, and the value was divided by 10 again to derive an overall average thickness of a single separator.

The average thickness $t_1$ (μm) of a porous substrate was determined by the following method. Only the porous substrate having no inorganic particle layer at least one surface was overlapped in 10 layers, each thickness was measured at 5 random points in TD by a thickness meter available from Mitutoyo, the value was divided by 5 to derive an average thickness of the 10-layer porous substrate, and the value was divided by 10 again to derive the average thickness $t_1$ of the porous substrate. In the case in which the average thickness $t_1$ of the porous substrate having the inorganic particle layer on at least one surface was determined, the inorganic particle layer was released using all methods known in the art without limitation and was sufficiently dried, and the average thickness $t_1$ of the porous substrate from which the inorganic particle layer had been released was determined.

[Packing Density of Inorganic Particle Layer]

The packing density of an inorganic particle layer was measured by the following method.

The average thickness $t_1$ of the porous substrate and the overall average thickness t of the separator having the inorganic particle layer on the porous substrate were measured, respectively, and the average thickness $t_1$ of the porous substrate was subtracted from the overall average thickness t of the separator to calculate the thickness (T, μm) of the inorganic particle layer. The separator having the inorganic particle layer provided on the porous substrate was cut into an area (S, $m^2$) of 10 mm×10 mm (0.01 $m^2$) to measure the weight, and the weight of the porous substrate only was subtracted to calculate the weight (W,g) of only the inorganic particle layer. The packing density of the inorganic particle layer was calculated by W/(T*S) (g/(m²·μm)).

[Withstand Voltage Characteristics (BDV/t)]

Dielectric breakdown voltage (BDV) was measured in accordance with ASTM D 149, and was evaluated as a voltage (kV) when a leakage current value was 5 mA which was measured under the conditions in which the separator was placed between electrodes of a withstand voltage tester (Croma, model 19052) under a dry room (dew point temperature: −60° C.) and then an applied voltage was raised at 5 kV/10 sec.

The overall average thickness t (μm) of the separator was obtained by overlapping the separator in 10 layers, measuring each thickness at 5 random points in TD by a thickness meter available from Mitutoyo, dividing the value by 5 to derive an average thickness of the 10-layer separator, and dividing the value by 10 again to derive the overall average thickness of a single separator.

Thereafter, for comparison of the secured dielectric breakdown voltage versus thickness, a BDV/t value which is a ratio of the dielectric breakdown voltage BDV measured above to the overall average thickness t of the separator was determined.

[Heat Shrinkage Rate]

The heat shrinkage rate of the separator was measured based on ASTM D 1204, by the following method. Grid points were marked at 2 cm intervals on a square having sides of on a separator. One side of the square was the transverse direction (TD) and the other side of the square was the machine direction (MD). A specimen was placed in the center, 5 sheets of paper were placed each on and under the specimen, and the four sides of the paper were wrapped with tape. The specimen wrapped in paper was allowed to stand in a hot air drying oven at 150° C. for 60 minutes. Thereafter, the specimen was taken out and the separator was observed with a camera, thereby calculating the shrinkage rate in the length direction of the following Equation 1 and the shrinkage rate in the width direction of the following Equation 2:

Shrinkage rate in the length direction (%)=(length in the length direction before heating−length in the length direction after heating)×100/length in the length direction before heating     Equation 1

Shrinkage rate in the width direction (%)=(length in the width direction before heating−length in the width direction after heating)×100/length in the width direction before heating     Equation 2

[TMA Melt Fracture Temperature]

Two types of specimens of the separator with a width of 5 mm and a length of 10 mm were prepared, with one specimen having a length direction in the machine direction and the other specimen having a length direction in a transverse direction. The specimens each having a thickness of 5 to 50 μm, a width of 5 mm, and a length of 10 mm in each of MD and TD serving as length directions were prepared as noted above, and each specimen is mounted on a chamber of a thermomechanical analyzer (TMA) (model: SDTA840 (Mettler Toledo)) by hooking both ends of each specimen to a metal jig and pulled downward with a force of 0.008 N while heating at 5° C. per minute, the temperature at which the specimen was broken in each of MD and TD was recorded.

[Battery Resistance]

A battery was manufactured under the following conditions, and discharge resistance was measured by a J-pulse method.

Manufacture of Battery 96 wt % of $LiCoO_2$ as a positive active material, 2.5 wt % of polyvinylidene fluoride as a fusion adhesive, and 3.5 wt % of carbon black as a conductive agent were added to N-methyl-2-pyrrolidone (NMP) as a solvent, and stirring was performed to prepare a uniform positive electrode slurry. The slurry prepared above was coated on an aluminum foil having a thickness of 30 μm, dried, and pressed to manufacture a positive electrode having a total thickness of 150 μm. 95 wt % of artificial graphite as a negative electrode active material, 3 wt % of acryl-based latex having Tg of −52° C. as a fusion adhesive, and 2 wt % of carboxymethyl cellulose (CMC) as a thickener were added to water as a solvent, and stirring was performed to prepare a uniform negative electrode slurry. The slurry prepared above was coated on a copper foil having a thickness of 20 μm, dried, and pressed to manufacture a negative electrode having a total thickness of 150 μm. The positive electrode and the negative electrode manufactured above, and the separator of the examples and the comparative examples were assembled into a pouch type battery in a manner of stacking the positive electrode, the negative electrode, and the separator so that the separator was interposed between the positive electrode and the negative electrode, and the assembled battery was heat-fused at 80° C. and 1 MPa with a heat press machine so that the positive electrode, the negative electrode, and the separator were fused to each other. Thereafter, an electrolyte solution in which 1 M lithium hexafluorophosphate ($LiPF_6$) was dissolved was injected into a solution including ethylene carbonate (EC), ethyl methyl carbonate (EMC), and dimethyl carbonate (DMC) at a volume ratio of 30:50:20, and sealed to manufacture a secondary battery having a capacity of 2 Ah.

EXAMPLES

Example 1

Preparation of Slurry 3.5 parts by weight of (3-aminopropyl)trimethoxysilane (APS) as a silane compound was added to 100 parts by weight of distilled water, dry ice was used to perform $CO_2$ bubbling, and 31 parts by weight of boehmite ($\gamma$-AlO(OH)) (D20: 0.13 μm, D50: 0.15 μm, D80: 0.22 μm, (D80−D20)/D50:0.6) as inorganic particles was simultaneously added thereto. While $CO_2$ bubbling was performed, the pH inside was maintained at 4 to 5, and ball mill stirring or bubbling were performed for 48 hours to prepare a slurry.

Pretreatment of Porous Substrate

Both surfaces of a polyethylene porous film (porosity: 52%, Gurley permeability: 82 sec/100 cc, tensile strength MD 2120 kgf/cm², TD 1915 kgf/cm²) having an average thickness ($t_1$) of 9 μm as a porous substrate film were corona discharge-treated (power density: 2 W/mm) to introduce a surface polar group, and the corona surface treatment was performed at a speed of 3 to 20 mpm (meter per minute).

Manufacture of Separator

Both surfaces of the pre-treated porous substrate were coated with the slurry and dried to form inorganic particle layers each having an average thickness of 1.5 μm on both surfaces (t=12 μm). The porous substrate having the inorganic particle layer provided thereon was aged at 100° C. for 12 hours to manufacture a separator. $t_1/t$ was 0.75.

Example 2

A separator was manufactured in the same manner as in Example 1, except that in the preparation of slurry, acetic acid was used instead of $CO_2$ bubbling.

Example 3

A separator was manufactured in the same manner as in Example 1, except that in the preparation of slurry, inorganic particles having the following particle size distribution were used.

Boehmite: D20: 0.15 μm, D50: 0.24 μm, D80: 0.4 μm, (D80–D20)/D50: 1.04

Comparative Example 1

A separator was manufactured in the same manner as in Example 1, except that in the preparation of slurry, 0.25 parts by weight of polyvinyl alcohol (PVA) having a melting temperature of 220° C. and a saponification degree of 99% and 2.75 parts by weight of acryl latex (ZEON, BM900B, solid content: 20 wt %) having Tg of −52° C. were mixed in 100 parts by weight of distilled water, and 25 parts by weight of boehmite (D20: 0.13 μm, D50: 0.5 μm, D80: 0.72 μm, (D80-D20)/D50: 1.18) as inorganic particles was added thereto to prepare a slurry, thereby forming inorganic particle layers each having an average thickness of 1.5 μm on both surfaces of the porous substrate.

Comparative Example 2

A separator was manufactured in the same manner as in Example 1, except that in the preparation of slurry, sulfuric acid was used instead of $CO_2$ bubbling as an acid component to prepare a slurry maintained at pH 3.5.

Comparative Example 3

A separator was manufactured in the same manner as in Example 1, except that in the preparation of slurry, an acid component was not separately added and a slurry at pH 8.2 was prepared.

Comparative Example 4

A separator was manufactured in the same manner as in Example 1, except that in the preparation of slurry, boehmite (D20: 0.21 μm, D50: 0.5 μm, D80: 1.22 μm, (D80–D20)/D50: 2.02) as inorganic particles was added at the same content instead of boehmite, thereby preparing a slurry.

[Evaluation Example] Evaluation of Separator

The results of evaluating the physical properties of the examples, and the comparative examples of the present disclosure are listed in the following Table 1.

TABLE 1

| | Packing density of inorganic particle layer | Withstand voltage characteristics (BDV/t) | Heat shrinkage rate (%) | | TMA melt fracture temperature (° C.) | | Battery resistance |
|---|---|---|---|---|---|---|---|
| | (g/(m² · μm)) | (kV/μm) | MD | TD | MD | TD | (mΩ) |
| Example 1 | 1.44 | 0.156 | 1.8 | 1.7 | 274 | 230 | 21.86 |
| Example 2 | 1.41 | 0.158 | 1.9 | 2.1 | 228 | 242 | 23.64 |
| Example 3 | 1.52 | 0.168 | 1.5 | 1.1 | 262 | 212 | 22.27 |
| Comparative Example 1 | 1.13 | 0.123 | 50.5 | 47.4 | 159 | 150 | 26.83 |
| Comparative Example 2 | 1.22 | 0.132 | 41 | 43 | 173 | 181 | 36.68 |
| Comparative Example 3 | 1.24 | 0.122 | 44 | 38 | 181 | 179 | 33.26 |
| Comparative Example 4 | 1.08 | 0.092 | 2.1 | 2.3 | 201 | 213 | 24.28 |

It is shown in Table 1 that the separators of the examples belonging to the present disclosure had a high packing density of the inorganic particle layer and significantly excellent withstand voltage characteristics, and simultaneously, had a low heat shrinkage rate at a high temperature of 150° C. and a high TMA melt fracture temperature to have significantly improved dimensional stability, but the separators of the comparative examples which did not belong to the present disclosure did not satisfy the physical properties. In addition, the secondary batteries manufactured using the separator of the examples had overall low battery resistance as compared with the batteries using the separators of the comparative examples.

In addition, the separators of Examples 1 to 3 had a TMA melt fracture temperature measured by TMA of 180° C. or higher at which they were melted and broken by heat in both MD and TD, and this shows that the heat shrinkage rate was significantly excellent, considering that the melting temperature of polyethylene used as the porous substrate of the separator was about 140° C. However, the separators of the comparative examples were melted and broken by heat at a temperature lower than 180° C., and it is shown that the thermal stability was poor as compared with the separators of the examples.

In Comparative Example 1 using a general organic polymer based binder, an inorganic particle layer having a thickness similar to the separators of the examples was formed, but the withstand voltage characteristics to be desired were not able to be secured, and had a very high heat shrinkage rate and a very low TMA melt fracture temperature as compared with the separators of the examples, and thus, had significantly poor thermal stability.

In Comparative Examples 2 and 3, pH was excessively low or high, and the low-molecular weight hydrolytic condensate of a silane compound was not able to be obtained, and thus, the withstand voltage characteristics and thermal stability to be desired were not able to be achieved.

In Comparative Example 4, the size of D50 of the inorganic particles was excessive and the particle size distribution defined in the present disclosure was not satisfied, and thus, the withstand voltage characteristics to be desired were not able to be secured.

An embodiment is a secondary battery separator having an inorganic particle layer in which inorganic particles are connected to each other to form pores, provided on at least one surface of the porous substrate, and a hydrolytic condensate of a polar silane compound which is prepared under specific conditions of hydrolyzing a silanol or alkoxysilane-based compound and simultaneously suppressing condensation may be used as a binder of the inorganic particle layer to significantly improve the thermal stability of the separator.

In addition, simultaneously, according to the embodiment, the binder which is the condensation-suppressed hydrolytic condensate of a silane compound and inorganic particles having a specific particle size distribution are applied to the inorganic particle layer together, thereby further increasing a packing density of the inorganic particle layer and improving a dielectric breakdown voltage even in a separator having the same thickness to improve withstand voltage characteristics. That is, dielectric breakdown voltage may be significantly improved even with a thin separator. Accordingly, dimensional stability at a high temperature may be further improved and also high capacity/high output characteristics and excellent withstand voltage characteristics may be secured.

An embodiment may provide a separator having a value of the following Formula (1) of 0.135 or more, 0.14 or more, or more, or 0.15 or more:

$$BDV/t \qquad (1)$$

wherein 'BDV' is a voltage (kV) measured in accordance with the standard of ASTM D 149 when a leakage current value is mA measured under conditions of raising an applied voltage at 5 kV/10 sec after placing the separator between electrodes of a withstand voltage tester, and 't' is an overall average thickness (μm) of the separator.

The separator according to an embodiment may secure high capacity/high output characteristics and excellent withstand voltage characteristics while further improving dimensional stability at a high temperature even with a thin inorganic particle layer being provided on at least one or both surfaces of the porous substrate. In an embodiment, when an average thickness of the porous substrate is $t_1$, a $t_1/t$ value may be 0.69 or more, 0.7 or more, 0.72 or more, or more, less than 1.0, 0.9 or less, 0.8 or less, or between the numerical values. In a specific embodiment, the $t_1/t$ value may be 0.69 or more or 0.69 or more and less than 1.0. In an embodiment, the $t_1/t$ value may be 0.72 or more or or more and less than 1.0.

In an embodiment, a packing density of the inorganic particle layer may be 1.3 g/(m²·μm) or more, 1.32 g/(m²·μm) or more, 1.35 g/(m²·μm) or more, 1.38 g/(m²·μm) or more, 2.5 g/(m²·μm) or less, 2.3 g/(m²·μm) or less, 2.0 g/(m²·μm) or less, or between the numerical values.

In an embodiment, when a (D80−D20)/D50 value is 0.01 to 2.0 in a particle size distribution of the inorganic particles, the inorganic particles are bound to the condensation-suppressed hydrolytic condensate of a silane compound to further increase the packing density and also further increase dielectric breakdown voltage, thereby further improving withstand voltage characteristics, which is thus more preferred.

In an embodiment, the separator may have better thermal stability so that when the separator is manufactured into specimens each of which has a thickness of 5 to 50 μm, a width of 5 mm, and a length of 10 mm in which a length direction is MD and TD, and the specimen is mounted on a chamber of TMA (Thermomechanical Analyzer, Model: SDTA840 (Mettler Toledo)) by hooking both ends of the specimen to a metal jig and pulled downward with a force of 0.008 N while heating at 5° C. per minute, the specimen is broken at a temperature of 180° C. or higher, 190° C. or higher, 200° C. or higher, or 210° C. or higher in both MD and TD.

In an embodiment, a heat shrinkage rate in MD and TD measured after the separator is allowed to stand at 150° C. for 60 minutes may be 3% or less, 2.5% or less, 2% or less, or 1% or less.

In an embodiment, when the porous substrate is subjected to a hydrophilic surface treatment including one or more of a corona discharge treatment and a plasma discharge treatment, a packing density of the inorganic particle layer may be further increased, thereby significantly improving dielectric breakdown voltage with a thin separator, which is thus more preferred.

In the embodiment, the reason that the packing density of the inorganic particle layer is high and the dielectric breakdown voltage is improved to improve withstand voltage characteristics is unclear, but it is considered that a polar functional group is provided on the surface of the porous substrate by the corona or plasma discharge treatment, the provided polar functional group is closely bonded to a binder which is the hydrolytic condensate of a silane compound and fixes the inorganic particle layer chemically or by a secondary bonding force such as a hydrogen bond, thereby further increasing the packing density of the inorganic particle layer, and thus, a surprising effect of significantly improving dielectric breakdown voltage with a thin separator is generated.

In addition, in an embodiment, the inorganic particle layer is formed and then an aging process is performed, thereby increasing an adhesive strength between the porous substrate and the inorganic particle layer and improving dimensional stability at a high temperature.

In an embodiment, a new separator satisfying all of the physical properties may be provided.

Hereinabove, although the present disclosure has been described by specific matters, and limited embodiments, they have been provided only for assisting the entire understanding of the present disclosure, and the present disclosure is not limited to the embodiments, and various modifications and changes may be made by those skilled in the art to which the present disclosure pertains from the description.

Therefore, the spirit of the present disclosure should not be limited to the above-described embodiments, and the following claims as well as all modifications equal or equivalent to the claims are intended to fall within the scope and spirit of the disclosure.

What is claimed is:

1. A method of manufacturing a separator, the method comprising:
   (a) adding inorganic particles and an acid component to an aqueous solution of a silane compound represented by the following Chemical Formula 1 and performing stirring or bubbling to prepare a slurry; and
   (b) applying the prepared slurry on at least one surface of a hydrophilic surface-treated porous substrate to form an inorganic particle layer, $$A_a Si(OR)_b \quad \text{[Chemical Formula 1]}$$

wherein 'A' is independently hydrogen, a polar functional group, or a C1-C10 alkyl group having a polar functional group, 'R' is independently hydrogen or a C1-C5 alkyl group, 'a' is 0 to 2, 'b' is 2 to 4, and a+b is 4,
   wherein a value of the following Formula (1) is 0.135 or more $$BDV/t \quad (1)$$

wherein
   'BDV' is a voltage (kV) measured in accordance with ASTM D 149 when a leakage current value is 5 mA measured under conditions of raising an applied voltage at 5 kV/10 sec after placing the separator between electrodes of a withstand voltage tester, and
   't' is an overall average thickness (μm) of the separator.

2. The method of manufacturing a separator of claim 1, wherein a (D80-D20)/D50 value is 0.01 to 2.0 in the inorganic particles.

3. The method of manufacturing a separator of claim 1, wherein the polar functional group includes any one or two or more of an amino group, an epoxy group, a carboxyl group, a hydroxyl group, an amide group, a thiol group, a ketone group, an ester group, and an aldehyde group.

4. The method of manufacturing a separator of claim 1, wherein the preparing of the slurry in the process (a) is performed under a weakly acidic atmosphere of more than pH 4 and pH 7 or less.

5. A method of manufacturing a separator, the method comprising:
   (a) adding inorganic particles and an acid component to an aqueous solution of a silane compound represented by the following Chemical Formula 1 and performing stirring or bubbling to prepare a slurry; and
   (b) applying the prepared slurry on at least one surface of a hydrophilic surface-treated porous substrate to form an inorganic particle layer, $$A_a Si(OR)_b \quad \text{[Chemical Formula 1]}$$

wherein 'A' is independently hydrogen, a polar functional group, or a C1-C10 alkyl group having a polar functional group, 'R' is independently hydrogen or a C1-C5 alkyl group, 'a' is 0 to 2, 'b' is 2 to 4, and a+b is 4,
   wherein a value of the following Formula (1) is 0.135 or more $$BDV/t \quad (1)$$

wherein
   'BDV' is a voltage (kV) measured in accordance with ASTM D 149 when a leakage current value is 5 mA measured under conditions of raising an applied voltage at 5 kV/10 sec after placing the separator between electrodes of a withstand voltage tester, and
   't' is an overall average thickness (μm) of the separator,
   wherein the acid component is carbon dioxide; or an organic acid including any one or two selected from acetic acid and lactic acid.

6. The method of manufacturing a separator of claim 1, further comprising: (c) aging the hydrophilic surface-treated porous substrate having the inorganic particle layer provided thereon, after the process (b).

7. The method of manufacturing a separator of claim 1, wherein the hydrophilic surface-treated porous substrate is formed by performing one or more of a corona discharge treatment and a plasma discharge treatment.

* * * * *